Oct. 20, 1953     C. THOMSON ET AL     2,656,035
CONVEYER BELT
Filed Aug. 30, 1949
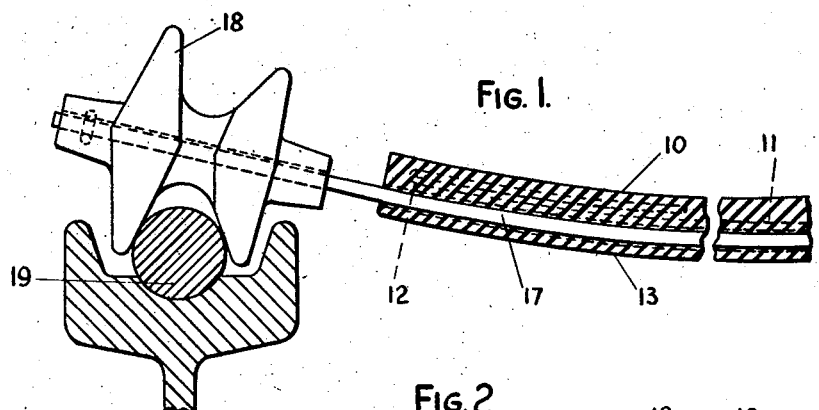
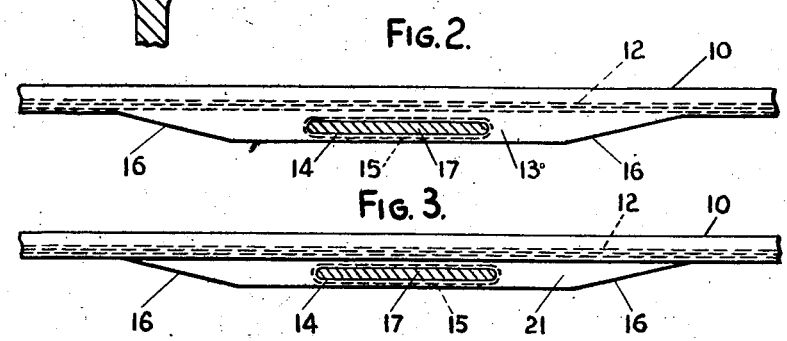
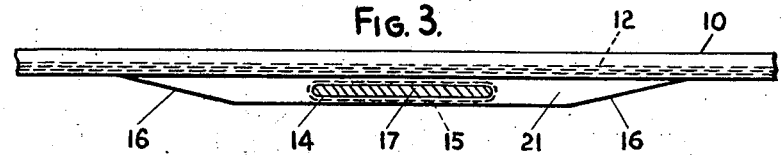
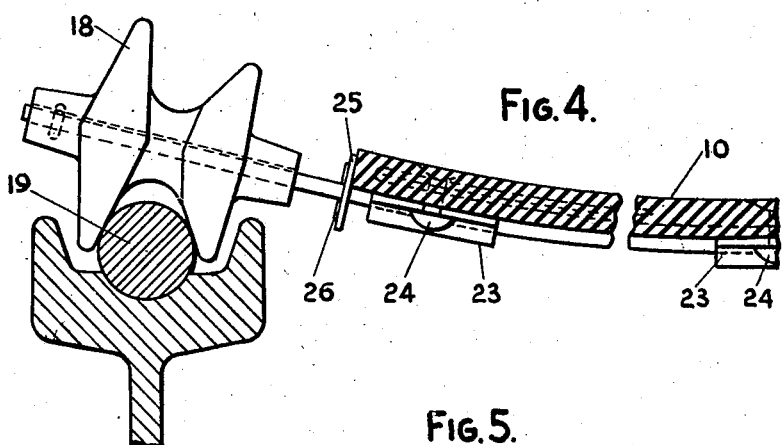
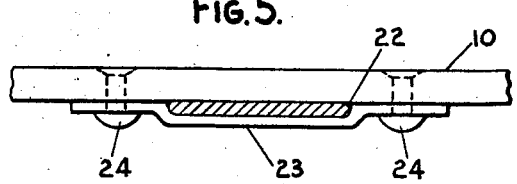
INVENTORS
Charles Thomson
Samuel Hunter Gordon
PER
Stevens, Davis, Miller & Mosher
their ATTORNEYS Patented Oct. 20, 1953

2,656,035

UNITED STATES PATENT OFFICE 2,656,035

CONVEYER BELT

Charles Thomson and Samuel Hunter Gordon, Inverness, Scotland, assignors to Cable Belt Limited, Inverness, Scotland Application August 30, 1949, Serial No. 113,095
In Great Britain March 2, 1949

2 Claims. (Cl. 198—201)

This invention relates to conveyor belts, and more particularly to belts for conveyors of the kind in which the driving load is taken by cables running over pulleys, and the belt, which is carried by the cables, serves merely to support the weight of the material being conveyed.

Belts for conveyors of this kind are usually attached to cross-bars or straps which are provided at their ends with cable engaging means.

The belts usually consist of a plurality of plies of textile fabric embedded in rubber, the rubber being thicker at the load-supporting face of the belt, and thinner at the "back" or other side, and the fabric acting to reinforce the belt.

A belt according to the present invention is formed with, or fitted with attachments to provide, openings through which the cross-bars or straps extend. The positioning of the cross-bars or straps in the openings locates them with respect to the belt both in the direction of the length of the latter and in the direction of the thickness of the latter. The cross-bars or straps may fit tightly in the openings to provide location in the direction of the width of the belt, or may be located in that direction by other suitable means.

One form of belt according to the invention has flat metal cross-straps which are enclosed in transverse strips of rubber or like material extending across one face of the belt.

The openings may be formed in transversely extending thickened portions of the rubber or like flexible material, generally definable as an elastomer, of which the belt is formed, the said thickened portions being either integral with the belt or formed separate therefrom and subsequently bonded thereto.

The invention is hereinafter described with reference to the accompanying drawings, in which:

Figure 1 is a transverse section through one form of belt according to the invention, the section being taken at the centre line of a cross-strap;

Figure 2 is a side elevation of a part of the belt shown in Figure 1, the head on the cross-strap being omitted;

Figure 3 is a side elevation, similar to Figure 2, of a slightly modified form of belt;

Figure 4 is a transverse section through another form of belt according to the invention; and Figure 5 is a side elevation of part of the belt shown in Figure 4.

Referring to Figures 1 and 2 the belt 10 is moulded from rubber, and is reinforced by a single ply of textile material 11 which is folded over near the edges of the belt, as at 12, to provide a three-ply reinforcement at the edges. The belt is formed at intervals with thickened portions 13 extending transversely of the belt, each such portion having a slot 14 which extends from side to side of the belt, and being reinforced by textile fabric 15 extending round the slot. The portions 13 are chamfered or inclined at their side edges, as shown at 16.

The cross straps 17, which are lengths of flat spring steel, pass through the slots 14, and project on either side of the belt to receive grooved heads 18 adapted to engage cables 19 supported and driven by an arrangement of idler and driving sheaves such as, for example, that described in the specification of our United States Patent application No. 143,069 dated February 8, 1950, and now abandoned. The cross straps 17 may be put in place before the belt is moulded, or may be inserted afterwards, being in the latter case, preferably a drive fit in the slots, so that the belt is not free to float laterally on the straps when in operation.

As shown in Figure 3, the thickened portions may be formed by strips of rubber 21 moulded separately from the belt and bonded thereto or fixed in any other suitable manner, as, for example, by rivets or staples passing through the belt, the strips 21 having slots 14, textile reinforcement 15, and chamfered edges 16 similar to those of the thickened portions formed integral with the belt.

Figures 4 and 5 show a form of belt in which the cross straps are passed through openings 22 formed between one face of the belt 10 and strips 23 of metal secured to the belt by rivets 24. The metal strips are bent as shown in Figure 5 to form the openings, and are spaced at intervals across the width of the belt, there being, for example, three strips 23 for each cross strap 17, one at each edge of the belt, and one in the centre. With this arrangement, the cross straps 17 may be a relatively loose fit in the openings and may be held against transverse movement with relation to the belt by washers 25 fitting on the cross straps and positioned thereon by split-pins 26 passing through the straps. It will be understood that the bent metal strips 23 may be replaced by pressings or stampings of suitable shape, which may be so formed as to provide ramps serving like the chamfers 16 shown in Figures 2 and 3, to permit smooth running of the belt over guide pulleys.

The cross straps are usually arranged on the side of the belt opposite to the load-carrying side, but, in the forms of belt shown in Figures 1 to 3, they may be arranged on the load-carrying side.

What we claim is:

1. A conveyor belt assembly for suspension between a pair of supporting and propelling cables, said assembly comprising a belt having a loading surface and consisting of a moulded elastomer and a reinforcing layer embedded in said elastomer, the belt having slots extending through said elastomer from edge to edge of the belt on the side of the reinforcing layer opposite to the loading surface, and cross straps passing one through each of the said slots and projecting laterally beyond the edges of the belt to receive cable-engaging means.

2. A conveyor belt assembly for suspension between a pair of supporting and propelling cables, said assembly comprising a belt having a loading surface and consisting of a moulded elastomer and a reinforcing layer embedded in said elastomer, spaced integral thickened portions extending from edge to edge of said belt on the side of the reinforcing layer opposite to said loading surface and each having a slot therein extending across the belt, and cross straps passing one through each of the said slots and projecting laterally beyond the edges of the belt to receive cable-engaging means.

CHARLES THOMSON.
SAMUEL HUNTER GORDON.

References Cited in the file of this patent

UNITED STATES PATENTS

| Number | Name | Date |
|---|---|---|
| 417,065 | Miller | Dec. 10, 1889 |
| 781,138 | Etcheverry | Jan. 31, 1905 |
| 1,559,772 | Peale | Nov. 3, 1925 |
| 2,264,332 | Peterson | Dec. 2, 1941 |

FOREIGN PATENTS

| Number | Country | Date |
|---|---|---|
| 308,857 | Great Britain | Apr. 4, 1929 |